No. 848,125. PATENTED MAR. 26, 1907.
C. W. PELTON.
INSECT TRAP.
APPLICATION FILED NOV. 6, 1906.
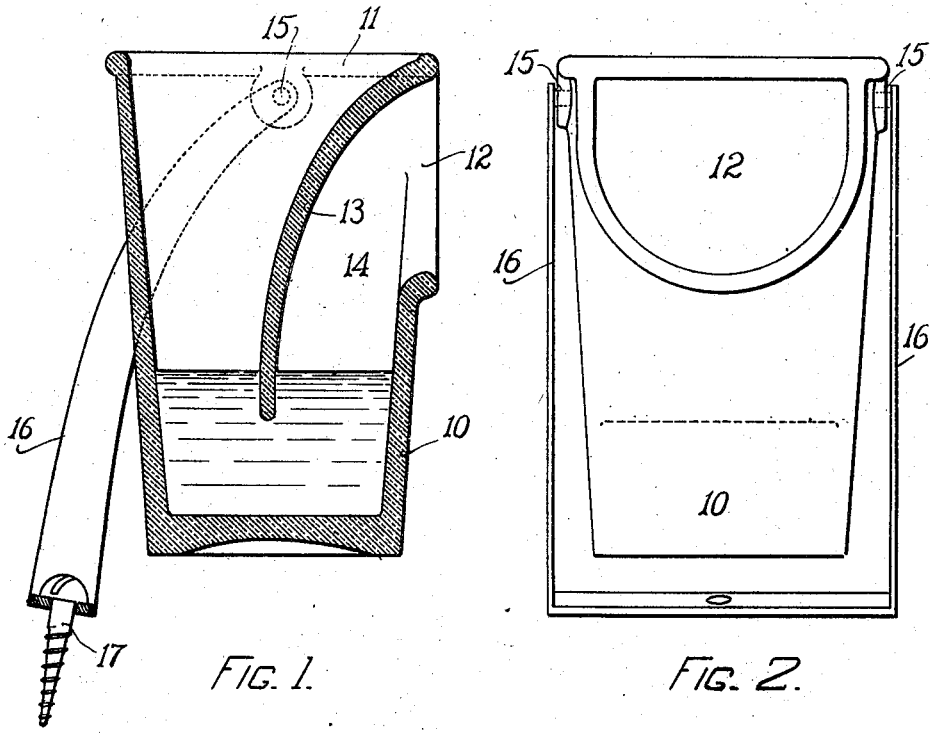
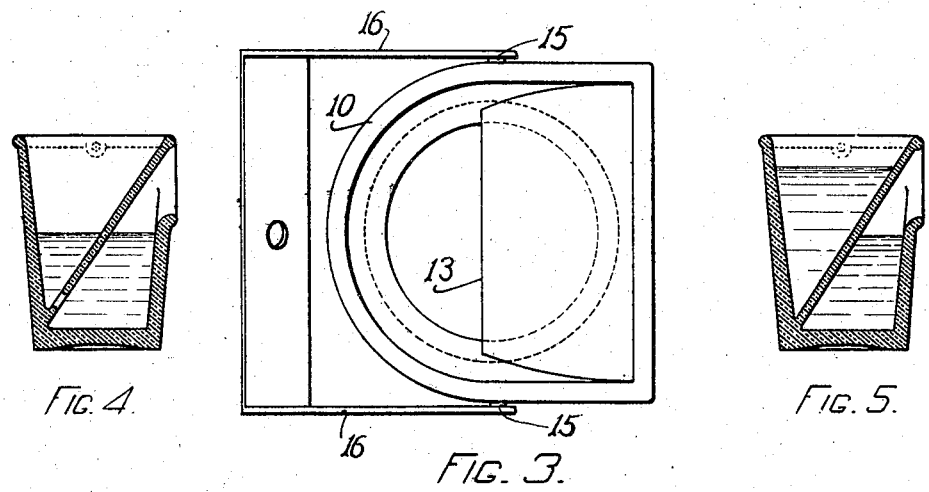
WITNESSES
INVENTOR
CHARLES W. PELTON
BY HIS ATTORNEY

UNITED STATES PATENT OFFICE.

CHARLES W. PELTON, OF HYANNIS, MASSACHUSETTS.

INSECT-TRAP.

No. 848,125.  Specification of Letters Patent.  Patented March 26, 1907.

Application filed November 6, 1906. Serial No. 342,246.

*To all whom it may concern:*

Be it known that I, CHARLES W. PELTON, of Hyannis, in the county of Barnstable and State of Massachusetts, have invented certain new and useful Improvements in Insect-Traps, of which the following is a specification.

This invention relates to insect-traps.

It is intended particularly for use in catching flies or other insects when resting in stationary position upon the wall or ceiling of a room. It constitutes an improvement upon my invention for the same purpose for which Letters Patent of the United States were granted to me on November 6, 1906, No. 835,253. In the invention there disclosed the purpose was accomplished by providing a cup adapted to be partly filled with warm water and soapsuds or lye, having an opening both at the top and at the upper portion of one side and having a lid arranged to cover either one of said openings at pleasure, leaving the other exposed for use. The purpose of the door was to close one of the openings, and thus prevent the escape therethrough of any insect which had entered the trap through the other.

In my present improvement I use a receptacle adapted to contain water and soapsuds or lye, as before, having an opening at the top and another at the upper portion of one side; but I dispense with the door or lid and leave both openings permanently open. In place of the door I employ such a construction that an insect entering at one opening has no access to escape through the other opening, being prevented by an intervening body of glass or of water, or of both.

Several forms in which this invention may be embodied are shown in the drawings, the preferred form being shown in Figure 1, in which a partition extends diagonally downward into the receptacle from the corner, separating the top and side openings, the partition passing below the level of water contained in the receptacle, but not reaching to the bottom. In another embodiment of the invention the said partition reaches to the very bottom, running diagonally across, but contains a perforation or hole which permits flow of water therethrough to equalize the levels on opposite sides of the partition. In still a third embodiment the perforation connecting the two sides of the partition is omitted.

In the accompanying drawings, Fig. 1 represents the preferred form in vertical section. Fig. 2 is a side elevation of the device shown in Fig. 1. Fig. 3 is a plan of the same. Fig. 4 is a vertical elevation of the first modification. Fig. 5 is a similar view of the second modification.

Referring to the drawings, 10 represents a cup or receptacle adapted to hold a liquid and is provided with two openings in its upper part for insects to enter, one at the top (marked 11) and one at the side near the top, (marked 12.) A partition 13, which constitutes the principal feature of the invention, runs from the corner at the top of the cup between openings 11 and 12 and proceeds diagonally inward and downward. This partition is so placed that a sufficient area of passage is permitted for insects to pass freely from the opening 11 or 12 into the body of the receptacle. The partition extends below the level of the lowest part of opening 12 far enough to dip beneath the level of the liquid contained in the receptacle. In practice the level of liquid would ordinarily be higher than that shown in Fig. 1 of the drawing; but it is well to have the partition extend below even the low level as there indicated in order to be always operative. This partition is preferably transparent, and for this purpose it is well to make the cup and partition of one integral piece of glass. When thus constructed, and when an insect resting on a vertical wall has been surrounded by placing the device against the wall around him, it rises in flight readily into the space or throat 14 and passes into the liquid, owing to the light which comes through the transparent parts, and the act of surrounding the insect is far more easily accomplished by virtue of the transparency of the apparatus, as the approach of a dark object is apt to frighten insects away.

The device is adapted to be hung upon pivots 15, carried by a fork 16, which may be held in the user's hand or may be attached by a screw 17 to a rod for use in high places.

In the form shown in Fig. 4 the partition is extended diagonally through the cup and a small perforation is placed near the bottom, allowing shifting of the liquid to maintain a uniform level on each side of the partition. In the form shown in Fig. 5 the partition is omitted.

In operation the device contains a quantity of a suitable liquid for entrapping insects. Warm water with soapsuds or lye is suitable for this purpose.

I claim—

1. An insect-trap, comprising a cup having an opening at its top and another opening at its side, and a partition between the openings extending downward in the cup.

2. An insect-trap, comprising a cup having an opening for insects at its top and another opening at its side, and a partition between the openings extending downward in the cup, there being spaces for liquid on opposite sides of the partition and communication therebetween below the liquid-level.

In testimony whereof I have affixed my signature in presence of two witnesses.

CHARLES W. PELTON.

Witnesses:
    EDWARD L. CHASE,
    RUFUS C. GARHAM.